United States Patent [19]

Curto et al.

[11] Patent Number: 5,465,122
[45] Date of Patent: Nov. 7, 1995

[54] NON-DEFORMABLE FRAME FOR SPECTACLES, AND IN PARTICULAR SPECTACLES FOR CHILDREN SO OBTAINED

[75] Inventors: Caterino Curto; Gianantonio Longo, both of Segusino, Italy

[73] Assignee: F.A.O.M.S. S.R.L., Segusino, Italy

[21] Appl. No.: 232,239

[22] PCT Filed: Feb. 2, 1994

[86] PCT No.: PCT/IT94/00008

§ 371 Date: May 2, 1994

§ 102(e) Date: May 2, 1994

[87] PCT Pub. No.: WO94/18597

PCT Pub. Date: Aug. 18, 1994

[30] Foreign Application Priority Data

Feb. 8, 1993 [IT] Italy .................................. TV93A0014

[51] Int. Cl.⁶ ...................................................... G02C 5/02
[52] U.S. Cl. .............................. 351/124; 351/41; 351/126
[58] Field of Search ............................ 351/125, 124, 351/126, 137, 136, 65, 68, 69, 71, 76, 128, 129

[56] References Cited

U.S. PATENT DOCUMENTS

| 1,103,118 | 7/1914 | Willson et al. |
| 1,278,417 | 9/1918 | Bader. |
| 1,663,402 | 3/1928 | Engel. |
| 1,919,938 | 7/1933 | Fielding. |
| 2,103,575 | 8/1936 | Diggins ........................... 88/41 |
| 2,239,266 | 4/1941 | Epstein ........................... 88/47 |
| 4,494,833 | 1/1985 | Takamura et al. ............. 351/129 |
| 4,983,029 | 1/1991 | Sato ................................. 351/124 |
| 5,042,934 | 8/1991 | Nakanishi ....................... 351/124 |
| 5,182,587 | 1/1993 | Hyoi ................................ 351/124 |

FOREIGN PATENT DOCUMENTS

| 0477375 | 9/1991 | European Pat. Off. |
| 2565366 | 1/1985 | France. |
| 2646247 | 4/1989 | France. |
| 3416912 | 11/1985 | Germany. |

OTHER PUBLICATIONS

Patent Abstracts of Japan, vol. 8, No. 89 (P–270) Apr. 24, 1984, JP,A, 59 003 415 (Shiiretsukusu Sangurasu K.K.), published Jan. 10, 1984.

Primary Examiner—William L. Sikes
Assistant Examiner—Hung Xuan Dang
Attorney, Agent, or Firm—Palmatier, Sjoquist & Helget

[57] ABSTRACT

Non-deformable frame for spectacles, and in particular spectacles for children so obtained, comprising a connection element between the lens surround, consisting of two bodies joined in a non rigid way, one of which is inserted coaxially to the other, and at least one torsion-bar preferably in steel, having the ends anchored to both lens surrounds, and to which the nose pads are associated to the respective lens surround providing for the interposition of a helical spring,

43 Claims, 1 Drawing Sheet

NON-DEFORMABLE FRAME FOR SPECTACLES, AND IN PARTICULAR SPECTACLES FOR CHILDREN SO OBTAINED

TECHNICAL FIELD

This invention relates to a non-deformable frame for spectacles, and in particular spectacles for children so obtained.

The innovation finds particular if not exclusive application in the sector of spectacles; in this case for the realization of a flexible structure, preferably metallic, able to support lenses.

BACKGROUND ART

At the present state of the art spectacles are well known. These accessories, always more frequently used by both adults and children, as already observed, can be of the corrective type, to cure eye pathologies, or of the sunglass type, used subjectively as a protection against solar radiation.

Spectacles, as a rule, are composed likewise of a frame, and of the respective lenses supported by it which are adapted by shaping them peripherally, according to the internal conformation of the respective, so-called, circles or lens surrounds. In other cases again, variations can be made to the support means of the lenses and can concern portions or parts of frame not joined at their ends, on which, previously, the respective lenses are fixed by screwing means. In this last hypothesis a successive adaptation of the lenses to the frame of the spectacles may not be necessary.

Generally, however, the traditional type frames can be subdivided into two large categories depending on the material from which they are made. The first are made of metal, while the second are of plastic material, furthermore alternative solutions could be provided that combine the two materials differently. Both then, have a common structure which provides circles or lens surrounds, held together by one or more connecting bridges depending on the aim. As regards the metallic frame, the use of the bridge, besides having an aesthetic factor, provides a stiffening means for the structure, mainly with the aim to avoid the phenomenon of buckling of the lens surrounds. And a certain rigidity of the structure is surely necessary also for maintaining a correct wearing of the spectacles, ensuring the focusing of the lens with respect to the eye to be corrected. Furthermore nose pads are associated to the frame of the spectacles, which have the function of supporting the frame by causing it to rest with the pad on the surface of the nose. Both for the bridge, and for the anchorage of the nose pads to the frame of the spectacles, one currently resorts to a simple welding of the ends, fixing the whole firmly to the profile of the lens surrounds. In a few variations, the nose pads can also be hinged to the support means to allow a greater adaptability of the frame with respect to the surface of the nose, and therefore avoiding the annoying sliding forwards of the spectacles.

However in the above mentioned solution, drawbacks appear, which are in fact that the frame is not sufficiently resistant to knocks and accidental deformation, causing the breaking of the weakest parts, as for example, the joint of the bridge to the lens surrounds, or even causing the deformation of the support arms of the nose pads. The rigidity of the frame, if subjected to an involuntary deformation, could also cause the lens to fall out of the surrounds and possibly break on reaching the ground. Such problems are greater amongst the younger public who are less careful with their spectacles, and also for example when playing games or participating in sports activities, breakages could occur.

A proposal to resolve even such a problem, has consisted in providing frames made entirely of a more or less rigid plastic material, for example of nose pads formed monolithically, these last being an increase of the border of the lens frame in correspondence with the resting arch at the bridge of the nose. The drawback of this type of frame is that it does not allow for a correct wearing, above all due to the absence of pronounced nose pads, therefore involving an inability to focus the lens so mounted in the lens surrounds. In the second place, having to guarantee a certain structural rigidity that should tend to prevent natural phenomena of elastic recall of the frame, they are not sufficiently flexible and able to avoid possible breakages in the critical stiffening points of the structure.

Some alternatives have intended subdividing the spectacle into two halves providing the use of hinges in an intermediate position with respect to the bridge, or have made only the lens surrounds flexible, playing on the type of material used, while in such a case the bridge and the nose pads have maintained their rigidity. Finally there exist devices, like those for the measurement of the diopters, that act by means of a screw positioned in proximity to the nose pads, that are able to adjust the amplitude of the lens surrounds, extending a telescopic element with bridge function for the connection between the same. But even in these umpteenth solutions it isn't difficult to discover drawbacks, which consist in the fact that both the nose pads and said bridge are always made of rigid elements and as such susceptible to breakage or at least deformation.

DISCLOSURE OF INVENTION

Aim of the present invention is also to obviate the above-mentioned drawbacks.

This and other aims are reached with the present innovation according to characteristics of the included claims, solving exposed problems by means of a non-deformable frame for spectacles, and in particular spectacles for children so obtained, comprising a connection element between the lens surrounds, composed from two bodies joined in a non-rigid way, of which one is inserted coaxially to the other, and at least one torsion-bar preferably in steel, having the ends anchored to both the lens surrounds, and in which the nose pads are associated to the respective lens surrounds providing for the interposition of a helical spring.

In such a way, through the notable creative contribution, the effect of which provides an immediate technical progress, different advantages are achieved, one being resistance to deformations and a considerable flexibility of the structure. In the second place, it is possible to confer to the spectacle a matchless wearability and comfort, as it adapts itself perfectly to the different conformations of the faces of the wearers. Not lastly, even the nose pads contribute to confer further characteristics of non-deformability to the structure, and furthermore the fact that the support is flexible allows it to also improve the degree of adaptability of the nose pads with respect to the anatomical structure of the nose.

These and other advantages will appear from the specified successive preferential description of solutions realized with the help of the schematic diagrams included, the particulars of which are not to be considered limiting but only illustrative.

Figure 1:
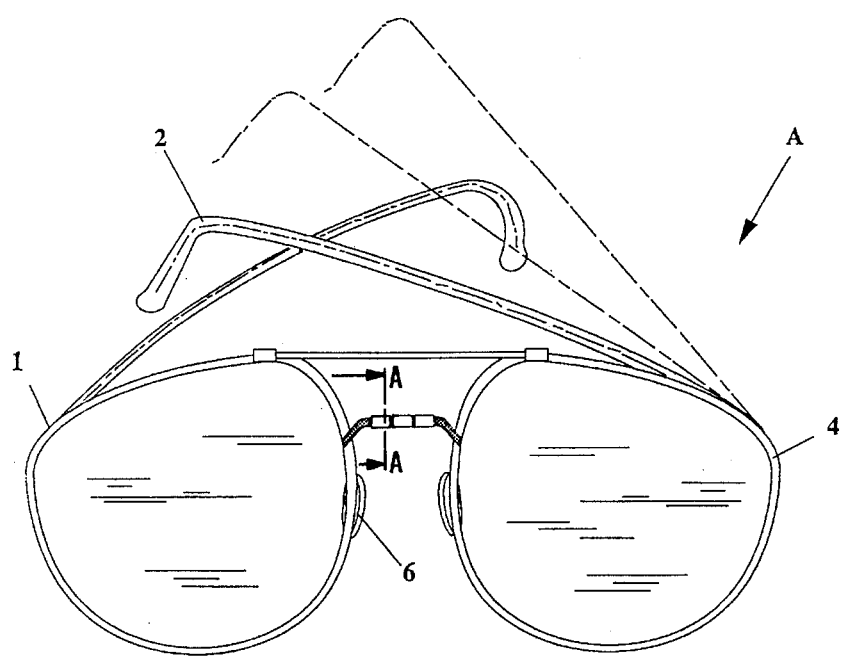
FIG. 1 represents a frontal view of a pair of spectacles provided with a frame of the non-deformable type.
Figure 2:
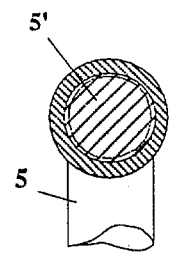
FIG. 2 represents a sectional view of the connecting bridge between the lens surrounds, according to a section of A—A of FIG. 1.
Figure 3:
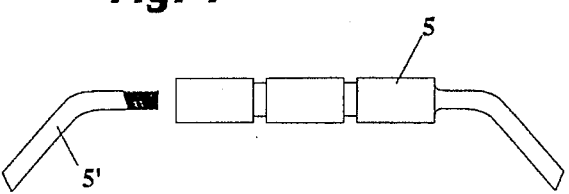
FIG. 3 represents a frontal view of a connecting bridge constituted by two associable elements.
Figure 4:
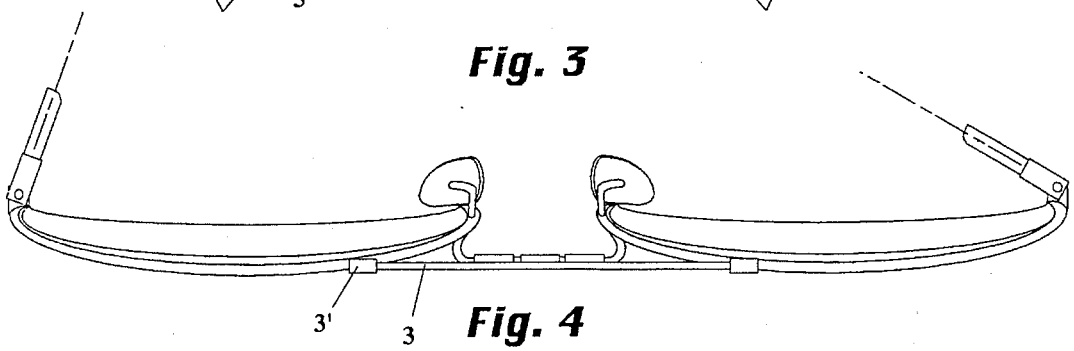
FIG. 4 represents a plane view of the frame of the spectacle in the conditions of normal use.
Figure 5:
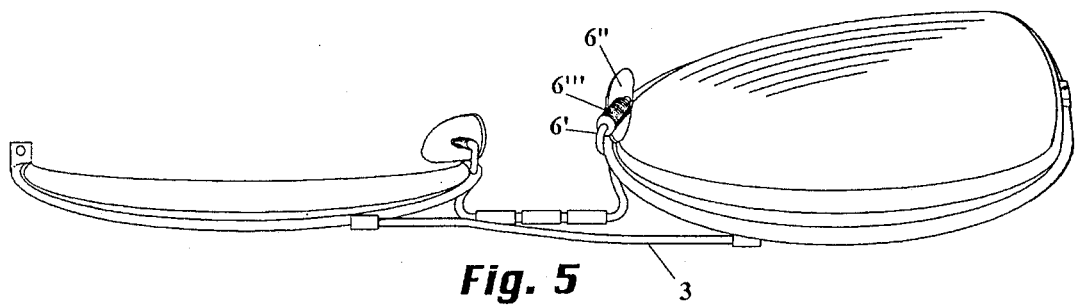

FIG. 5 always represents a plane view of the frame of the spectacle but without the arms, in which at least one of the two lens surrounds has been subjected to a forced torsion with respect to the other, that visa versa remains in position.

Also making reference to the figure it is revealed that a spectacle (A), is made from a frame (1) to which, with known hinges, are associated relative arms (2). In more detail, the frame (1), provides a torsion-bar (3) in steel, the ends of which are inserted to the inside of the opposite bearings (3') that thus cover these ends and are firmly fixed by these to the frame of the spectacle (4) in correspondence to the upper profile, nearly at the height of the eyebrow arch. Immediately below the said torsion-bar (3) a second means of connection is provided between the lens surrounds (4). Said connection means consists of two metallic elements, (5, 5'), respectively a left one and a right one, associated one to the other, the opposite ends of which are welded to the frame of the corresponding lens surrounds, on the outside. The conformation of each element (5', 5") is such as to essentially provide a first straight line followed by a gentle slightly accentuated curve, which has an angle of >45°, to then continue with a second straight line. Such conformation is dictated mainly by the fact that, once the two elements (5', 5") are associated in contrapposition, they confer a classical arch shape to the bridge so obtained. A first element (5), provides on the side opposite to the point of fixing on the lens surround (4), the formation of an internally threaded blind hole, while the second element (5') fixed in contrapposition on the adjacent lens surround, provides for the corresponding male termination also threaded in the same manner as the inside of the hole made in element (5). In this case, the means of connection (5, 5') is previously assembled, screwing one metallic element into the other so as to allow each the possibility of a rotation equal to at least a quarter screw turn, allowing a complete movement of 180°, that corresponds to about 90° for each side. Once the elements (5', 5") are assembled, forming the bridge, this is traditionally fixed to the lens surrounds (4) of the said frame. In order to confer greater characteristics of non-deformability to the frame and greater wearability, even the nose pads (6) are associated to flexible supports. These include a curved support (6'), welded at one end to the lens frame, preferably on the internal border. The structure of said curved support (6') is made essentially of two parts, including respectively a first rigid line of anchorage to the frame of the spectacle, and a second (6'''), consisiting of a helical spring, the ends of which are welded on one side to the first rigid line, and on the other side to a means of hinging of the nose pad (6"). In FIG. 5., a typical torsion movement, used on the frame of the spectacles made according to the teaching above described, is illustrated.

We claim:

1. A non-deformable frame assembly for spectacles having a pair of lens surrounds joined by an upper connecting bar and a lower bridge connector, comprising:

a) said upper connecting bar comprising a torsion bar having respective ends fixedly attached to each of said lens surrounds; and b) said lower bridge connector comprising a first metallic element having one end affixed to one of said lens surrounds and having another end comprising an internally threaded blind hole; and a second metallic element having one end affixed to the other of said lens surrounds and having another end comprising a male threaded termination engageable into said threaded blind hole.

2. The frame assembly of claim 1, wherein said respective another ends of said first and second metallic elements are engageable along an axis, and said axis is parallel to said torsion bar.

3. The frame assembly of claim 2, wherein said first metallic element further comprises a bend greater than 45° between its respective ends, and said second metallic element further comprises a bend greater than 45° between its respective ends.

4. The frame assembly of claim 3, wherein said upper connecting bar further comprises a steel torsion bar.

5. The frame assembly of claim 1, further comprising a nose pad support and nose pad affixed to each of said lens surrounds, said nose pad support having a helical spring affixed thereto, said helical spring attached to a nose pad.

6. A frame for spectacles comprising:

a) a left lens surround and a right lens surround, each lens surround having an upper portion;

b) a torsion bar having a left end and a right end, the left end of the torsion bar being firmly fixed to the upper portion of the left lens surround, the right end of each torsion bar being firmly fixed to the upper portion of the right lens surround; and c) a bridge positioned between the left lens surround and the right lens surround and spaced from said torsion bar and connecting the left lens surround with the right lens surround, said bridge comprising a right body having a first end and a second end and a left body having a first end and a second end, the first end of said left body being anchored to the left lens surround, the first end of the right body being anchored to the right lens surround, the second end of the left body cooperating with the second end of the right body so as to permit relative rotation of one of the bodies with respect to the other body.

7. A frame for spectacles in accordance with claim 6, wherein the second end of the left body is rotatably connected to the second end of the right body.

8. A frame for spectacles in accordance with claim 6, further comprising left and right nose pads, with the left nose pad being associated with the left lens surround and the right nose pad being associated with the right lens surround.

9. A frame for spectacles in accordance with claim 8, wherein each nose pad is mounted on the respective lens support by a flexible support.

10. A frame for spectacles in accordance with claim 9, wherein each flexible support comprises a helical spring.

11. A frame for spectacles in accordance with claim 6, wherein each of said torsion bar and said bodies is made of metal.

12. A frame for spectacles in accordance with claim 6, wherein the bridge has an arch shape.

13. A frame for spectacles in accordance with claim 12, wherein each of the bodies comprises a first straight line portion connected by a curved portion to a second straight line portion.

14. A frame for spectacles in accordance with claim 13, wherein the left body is rotatably connected to the right body.

15. A frame for spectacles in accordance with claim 14, wherein the second end of the left body has a threaded hole while the other second straight line portion has a correspondingly threaded male termination for engaging the threaded hole in the left body.

16. A frame for spectacles in accordance with claim 15, wherein the left body and right body are screwed together to allow each body the possibility of rotation equal to at least a quarter turn.

17. A frame for spectacles in accordance with claim 16, wherein the left and right bodies are welded to the respective lens surround.

18. A frame for spectacles in accordance with claim 17, further comprising left and right nose pads, with the left nose pad being associated with the left lens surround and the right nose pad being associated with the right lens surround.

19. A frame for spectacles in accordance with claim 6, wherein the left body and the right body are joined together so as to allow the possibility of a total relative rotation of 180°.

20. A frame for spectacles in accordance with claim 19, wherein the left body and the right body are screwed together to allow each body the possibility of rotation equal to at least a quarter turn.

21. A frame for spectacles in accordance with claim 20, wherein each of the left body and the right body is a metallic element.

22. A frame for spectacles in accordance with claim 21, wherein the bridge has an arch shape, wherein each of the bodies comprises a first straight line portion connected by a curved portion to a second straight line portion, and wherein the second straight line portion of the left body is rotatably connected to the second straight line portion of the right body.

23. A frame for spectacles in accordance with claim 6, wherein one of the second end of the left body and the second end of the right body is provided with a threaded hole while the other of the second end of the left body and the second end of the right body is provided with a correspondingly threaded male termination.

24. A frame for spectacles in accordance with claim 6, wherein the second end of the right body is inserted coaxially into the second end of the left body for rotation therein upon flexure of the frame.

25. A frame for spectacles in accordance with claim 24, wherein the first end of the left body and the first end of the right body is welded to the respective lens surround.

26. A frame for spectacles in accordance with claim 25, wherein the second straight line portions is provided with a threaded hole while the other second straight line portion is provided with a correspondingly threaded male termination, and wherein the second straight line portions are screwed together to allow each body the possibility of rotation equal to at least a quarter turn after the bridge is fixed to the lens surrounds.

27. A frame for spectacles comprising:
a) a left lens surround and a right lens surrounds, each lens surround having an upper portion;
b) at least one torsion bar having a left end and a right end, the left end of the torsion bar being firmly fixed to the upper rim portion of the left lens surround, the right end of each torsion bar being firmly fixed to the upper rim portion of the right lens surround; and
c) a bridge positioned between the left lens surround and the right lens surround below said at least one torsion bar and connecting the left lens surround with the right lens surround, said bridge comprising a right body having a first end and a second end and a left body having a first end and a second end, the first end of said left body being anchored to the left lens surround, the first end of the right body being anchored to the right lens surround, the second end of the left body being joined to the second end of the right body so as to permit relative rotation of one of the bodies with respect to the other body upon one of the lens surrounds being subjected to a forced torsion with respect to the other lens surround.

28. A frame for spectacles in accordance with claim 27, wherein each of said torsion bar and said bodies are made of metal.

29. A frame for spectacles in accordance with claim 27, wherein the bridge has an arch shape.

30. A frame for spectacles in accordance with claim 29, wherein each of the bodies comprises a first straight line portion connected by a curved portion to a second straight line portion.

31. A frame for spectacles in accordance with claim 30, wherein the second straight line portion of the left body is rotatably connected to the straight line portion of the right body.

32. A frame for spectacles in accordance with claim 31, wherein one of the second straight line portions is provided with a threaded hole while the other second straight line portion is provided with a correspondingly threaded male termination.

33. A frame for spectacles in accordance with claim 32, wherein the second straight line portions are screwed together to allow each body the possibility of rotation equal to at least a quarter turn.

34. A frame for spectacles in accordance with claim 33, wherein each straight line portion is welded to the respective lens surround.

35. A frame for spectacles in accordance with claim 34, further comprising left and right nose pads, with the left nose pad being associated with the left lens surround and the right nose pad being associated with the right lens surround.

36. A frame for spectacles in accordance with claim 27, wherein the left body and the right body are joined together so as to allow the possibility of a total relative rotation of 180°.

37. A frame for spectacles in accordance with claim 27, wherein one of the second end of the left body and the second end of the right body is provided with a threaded hole while the other of the second end of the left body and the second end of the right body is provided with a correspondingly threaded male termination.

38. A frame for spectacles in accordance with claim 27, wherein the left body and the right body are screwed together to allow each body the possibility of rotation equal to at lease a quarter turn.

39. A frame for spectacles in accordance with claim 37, wherein one of the second end of the left body and the second end of the right body is inserted coaxially into the other of the second end of the left body and the second end of the right body.

40. A frame for spectacles in accordance with claim 39, wherein each of the left body and the right body is a metallic element.

41. A frame for spectacles in accordance with claim 40, wherein each one of the first end of the left body and the first end of the right body is welded to the respective lens surround.

42. A frame for spectacles in accordance with claim 41, wherein the bridge has an arch shape, wherein each of the bodies comprises a first straight line portion connected by a curved portion to a second straight line portion, and wherein the second straight line portion of the left body is rotatably connected to the second straight line portion of the right body.

43. A frame for spectacles in accordance with claim 42, wherein one of the second straight line portions is provided with a threaded hole while the other second straight line portion is provided with a correspondingly threaded male termination, and wherein the second straight line portions are screwed together to allow each body the possibility of rotation equal to at least a quarter turn after the bridge is fixed to the lens surrounds.

* * * * *

UNITED STATES PATENT AND TRADEMARK OFFICE
CERTIFICATE OF CORRECTION

PATENT NO. : 5,465,122
DATED : November 7, 1995
INVENTOR(S) : Caterino Curto and Gianantonio Longo It is certified that error appears in the above-indentified patent and that said Letters Patent is hereby corrected as shown below:

Column 2, line 7, after "of" add -- the acetate cellulose type, the lens surrounds, joining-bridge and relative --.

In claim 38, column 6, line 52, "27" should be -- 37 --.

Signed and Sealed this

Thirtieth Day of January, 1996

Attest:

BRUCE LEHMAN

Attesting Officer

Commissioner of Patents and Trademarks